United States Patent Office 3,177,683
Patented Apr. 13, 1965

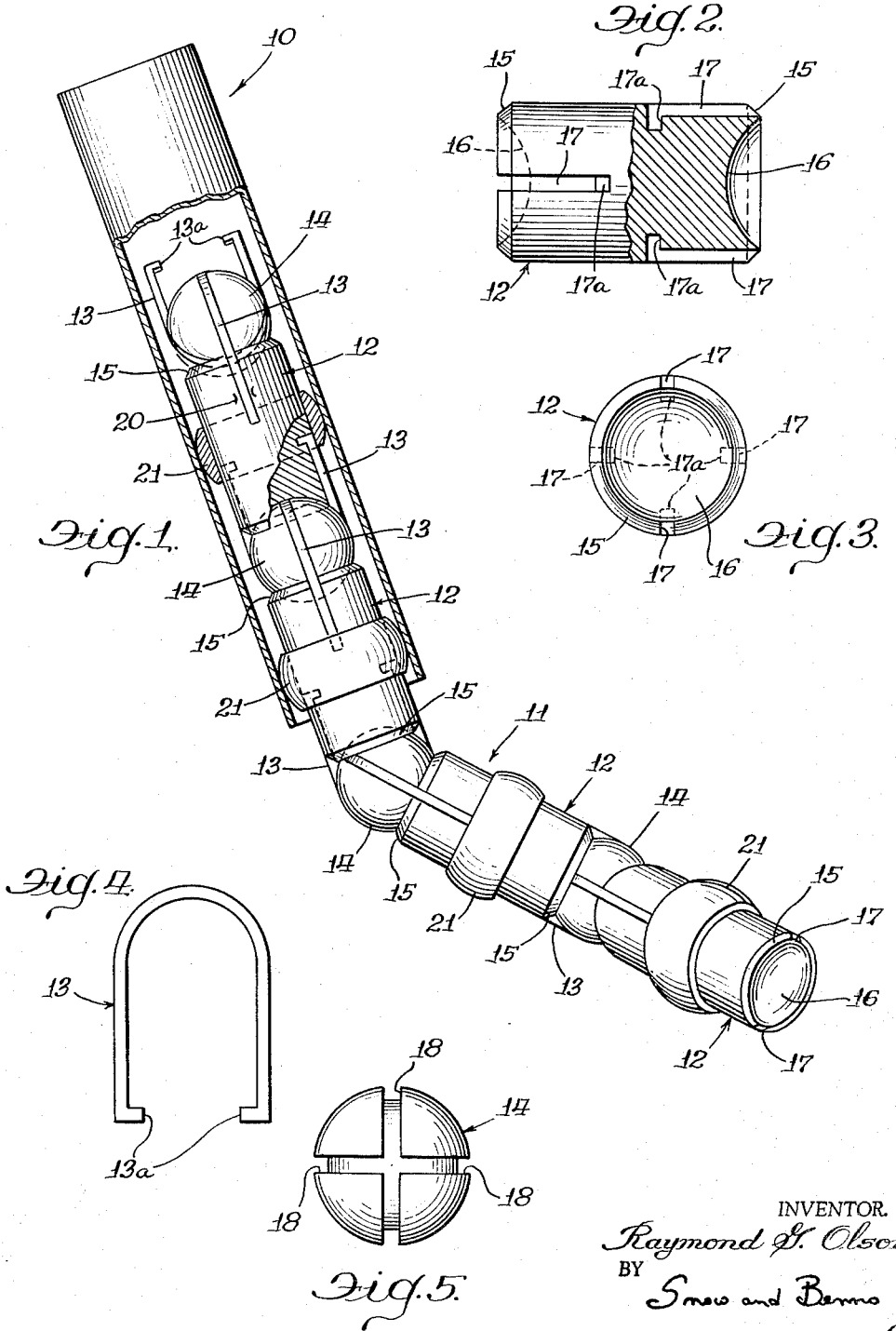

3,177,683
FLEXIBLE CABLE ASSEMBLY
Raymond G. Olson, Niles, Ill., assignor to Ray Laboratories, Inc., a corporation of Illinois
Filed Oct. 31, 1962, Ser. No. 234,407
3 Claims. (Cl. 64—2)

This invention relates generally to flexible cable assemblies, and more particularly to a novel cable assembly, which in addition to having the function of push-pull operation, also has the function of rotating operation.

The primary object of the present invention is to provide a novel flexible cable assembly which will simultaneously or separately perform both push-pull operations and rotary operations.

It is a further object to provide a novel flexible cable assembly for both push-pull and rotating operations which is simple in construction and efficient in operation.

An important feature of the invention is that in the operation of the device in performing rotating operations, the output speed, for a constant input speed, will be a constant speed independently of the tortuous path or convolutions of the assembly.

Other objects and features of the invention will be apparent upon a perusal of the following specification and drawing in which:

FIGURE 1 is a plan view of a portion of a flexible cable assembly constructed according to the invention;

FIGURE 2 is an enlarged side plan view of one of the links of FIGURE 1;

FIGURE 3 is an end view of the structure shown in FIGURE 2;

FIGURE 4 is an enlarged plan view of one of the clips of FIGURE 1; and

FIGURE 5 is an enlarged view of one of the balls of FIGURE 1.

The present embodiment is the preferred embodiment, but it is to be understood that changes can be made in the present embodiment by one skilled in the art without departing from the spirit and scope of the present invention.

Generally, the flexible cable assembly of the invention comprises a flexible cable sheath and a cable core carried in the cable sheath. The cable sheath may be formed of any suitable materials and in any manner well known in the art thereof. The unique cable core comprises an assembly of a plurality of links, clips, and balls. The links are formed in the shape of short rod sections with each end of each link having a partially spherical cavity. Each link is further provided at each end thereof with a pair of diametrically opposed and longitudinally extending grooves. The pair of grooves at one end of a link disposed at substantially 90° to the pair of grooves at the other end of the link. The pairs of grooves in the links are provided to receive the leg portions of somewhat horseshoe-shaped clips therein. The shape of the clips is clearly shown in FIGURE 4. The partially spherical cavities in the ends of the links are provided to therein receive portions of a number of balls such as shown in FIGURE 5. The balls are provided with a pair of perpendicularly disposed annular grooves which divide the outer surface of each ball into four sections or quadrants.

The cable core is assembled in such a manner that two clips are placed in the grooves of each ball with the legs of the clips extending in opposite directions. Each ball is seated in the partially spherical cavities of two adjacent links, and the extending legs of the clips are secured in the cooperating grooves of the links. This arrangement is repeated in the manner of a chain to complete the cable core assembly. The clips may be secured in the links by a staking operation or by any other suitable arrangement. The present embodiment discloses a further arrangement for locking the clips in the links by use of a short sleeve which is mounted on each link substantially at the longitudinal center thereof. Each sleeve has a length sufficient to span the extreme end portions of the clips of one link to thereby lock the clips into the grooves of the link. The sleeves of the present embodiment although effectively serving to lock the slips in place are primarily provided to prevent binding of the cable core in the cable sheath under conditions of extremely tight convolutions of the cable assembly. The outer diameter of the sleeves is substantially equal to the inner diameter of the cable sheath.

In operation, the cable core may be moved in a push and pull operation relative to the cable sheath or the core may be rotated within the cable sheath. These operations may be performed separately or concurrently. Because each clip is slidable in the grooves of the balls, a constant speed drive or output is experienced for a constant speed or drive input. This feature is difficult to illustrate in the drawing and is most easily seen when a convoluted core is rotated. To aid in an understanding of this feature, the uppermost ball in FIGURE 1 is shown turned with the upwardly extending legs of the free clip projecting inwardly of the drawing. The lowermost link in FIGURE 1 is shown partially turned outwardly of the drawing. By a careful consideration of FIGURE 1 it may be seen that if the lowermost link is rotated with the cable assembly aligned such as shown at FIGURE 1, the ball between the lowermost link and the second link, and the ball between the second and third links, will rock within the clips to produce a constant speed drive.

In detail, the cable sheath is indicated generally at 10 and the cable core is indicated generally at 11. The cable sheath may be formed of any suitable material such, for example, as a helically wound wire or strip material which will permit the cable sheath to be bent on arcs to produce any desired convolutions thereof.

The cable core 11 comprises a plurality of links 12, clips 13, and balls 14.

Each link 12 is formed as a short rod section of any suitable material. The links 12 may be made of metal such as steel, aluminum, or brass, or may be made of a plastic material. The outer end portions of each link are beveled as at 15. A partially spherical cavity 16 is formed in each end of each link 12. Each link 12 is further provided with four grooves 17. The grooves 17 are formed in the outer surface of the links 12 and are arranged in pairs at each end of the links 12. The grooves 17 of each pair of grooves 17 are diametrically disposed, and each pair of grooves 17 is disposed at 90° to the other pair of links 12. The inner end of each groove 17 is provided with a radially inwardly projecting extension 17a.

The clips 13 are formed of a material such as steel or brass wire and in the present embodiment are substantially square in cross section. Clips having other cross sectional shapes such as round or partially round may be used. The clips 13 are U-shaped with the ends of the legs thereof bent inwardly as at 13a. Each clip 13 is positionable with the leg portions thereof disposed within the grooves 17 at one end of one of the links 12 and with the end portions 13a extending into the groove portions 17a. Each link 13 further has a cross sectional height and width substantially equal to the cross sectional height and width of each groove 17.

The balls 14 may be formed of a material such as steel, aluminum, brass, or a plastic such as molded nylon. Each ball 14 is provided with a pair of perpendicularly disposed annular grooves 18. The grooves 18 each have a cross sectional height and width substantially equal to the cross sectional height and width of the clips 13. Each ball 14 has a diameter substantially equal to the diameter of the links 12.

In the assembly of the cable core 11, two clips 13 are placed in the grooves 18 of each ball 14 with the legs of the clips 13 extending in opposite directions. This arrangement is clearly shown in FIGURE 1 and permits either one of the clips 13 on one ball 14 to be moved in its groove 18 through an angle of approximately 160° relative to the other clip 13. Each ball 14 is carried between the ends of two links 12 with the clips 13 disposed in the grooves 17 of the links 12. The partially spherical cavities 16 have the same radius of curvature as the balls 14, and the clips 13 have a length such that when the ends 13a of the clips 13 are disposed within the portions 17a of the grooves 17, the balls 14 are firmly seated in the cavities 16. The clips 13 may be secured in the grooves 17 by any suitable means such as staking shown at 20 in FIGURE 1. The aforedescribed interconnection of links 12, clips 13 and balls 14 is repeated until the cable core has a total length proper for the length of the sheath 10.

Although not essential to the practice of the invention, the present embodiment is provided with a plurality of sleeves 21. The purpose of the sleeves 21 is to prevent binding of the cable core 11 in the sheath 10, especially when the links 12 are substantially longer than the diameter of the balls 14 and when the cable assembly is used under conditions of relatively tight or extreme convolutions thereof. As can be seen in FIGURE 1 wherein the links 12 are roughly twice as long as the diameter of the balls 14, the sleeves 21 prevent binding in a sharp turn of the cable core 11 and sheath 10. The sleeves 21 may be formed of any material such as steel, aluminum, brass, or a plastic such as molded nylon. The sleeves 21 have an inner diameter substantially equal to the diameter of the links 12, and in the present embodiment, a length sufficient to span the end portions of the two clips 13 on each link 12. This lapping of the ends of the clips 13 by the sleeves 21 serves to lock the clips 13 in the grooves 17 either in addition to the staking 20 or in place of the staking 20. The outer diameter of the sleeves 21 is substantially equal to the inner diameter of the sheath 10. The outer surface of the sleeves 21 may have any suitable shape effecting a minimum of friction in sliding on the inner walls of the sheath 10. In the present embodiment the outer surface of the sleeves 21 is curved or crowned.

Having described the invention what is considered new and desired to be protected by Letters Patent is:

1. In a flexible cable assembly, a cable sheath, a cable core carried in said cable sheath for longitudinal and rotational movement relative to said sheath, said cable core comprising a link having a partially spherical cavity at one end thereof, a ball, a pair of perpendicularly disposed annular grooves formed in the surface of said ball, a pair of substantially U-shaped clips, each of said clips slidably carried in one of said annular grooves of said ball with the legs of said clips extending in opposite directions, a pair of grooves formed in the surface of and at one end of said link with said grooves being disposed on opposite sides of said link and extending longitudinally thereof, the legs of one of said clips being carried in the grooves of said link with said ball firmly seated in said cavity, and other core means extending through sheath in one direction from said link and in the other direction from the legs of the other of said clips, the inner ends of said grooves of said links are being formed as laterally inwardly extending depressions, and the ends of the legs of said one of said clips having laterally inwardly extending projections caried in said depressions, a sleeve carried on said link over the leg end portions of said one of said clips to lock one of said clips in said grooves of said link, and the outer diameter of said sleeve being formed substantially equal to the inner diameter of said sheath.

2. In a flexible cable assembly, a cable sheath, a cable core carried in said cable sheath for longitudinal and rotational movement relative to said sheath, said cable core comprising a link having a partially spherical cavity at each end thereof, a pair of balls, a pair of perpendicularly disposed annular grooves formed in the surface of each of said balls, two pairs of substantially U-shaped clips, each pair of clips being slidably carried in the annular grooves of one of said balls with each clip being carried in one of said annular grooves and with the legs of each pair of clips extending in opposite directions, the legs of one of said clips of one pair of clips being positioned on and longitudinally of said link at one end thereof with one of said balls seated in the cavity at said one end of said link, the legs of one of said clips of the other pair of said clips being positioned on the other end of said link and longitudinally thereof with the other of said balls seated in the cavity at said other end of said link and with the planes of the secured links being perpendicularly disposed, a bearing sleeve mounted on and substantially at the longitudinal center of said link with said sleeve positioned over the ends of the legs of said one clips to lock said one clips to said link, and other core means extending through said sheath in opposite directions from the legs of the other clips of said pairs of clips.

3. In a flexible cable assembly, a cable sheath, a cable core carried in said cable sheath for longitudinal and rotational movement relative to said sheath, said cable core comprising a plurality of links alternately arranged with a plurality of balls, and means interconnecting said links and balls as a flexible cable core, said means comprising a plurality of U-shaped clips, each of said balls having perpendicularly disposed annular grooves formed in the surface thereof, each of said clips being slidably carried in one of the annular grooves in said balls, each of said links having a partially spherical cavity at each end thereof, and means securing the legs of each pair of clips carried on one of said balls to respective ones of the links on each side thereof with said balls seated in said cavities, said last mentioned means comprising a plurality of bearing sleeves, each of said sleeves being mounted on and substantially at the longitudinal center of one of said links, each of said sleeves further positioned over the ends of the legs of the two clips on each one of said links to secure said clips to said links.

References Cited by the Examiner

UNITED STATES PATENTS

| 595,538 | 12/97 | Gardner | 64—16 |
| 1,281,918 | 10/18 | Ecaubert | 64—2 |
| 2,024,912 | 12/35 | Curtis | 64—16 |
| 2,841,967 | 7/58 | Baker | 64—16 |

FOREIGN PATENTS

| 1,165,664 | 6/58 | France. | |

FRANK SUSKO, *Primary Examiner.*
ROBERT C. RIORDON, *Examiner.*